United States Patent Office 3,419,609
Patented Dec. 31, 1968

3,419,609
PREPARATION OF ALKALI METAL SALTS OF NITRILOTRIACETIC ACID
John W. Sibert, Birmingham, Mich., assignor to Ethyl Corporation, New York, N.Y., a corporation of Virginia
No Drawing. Filed Apr. 1, 1965, Ser. No. 444,837
7 Claims. (Cl. 260—534)

ABSTRACT OF THE DISCLOSURE

Method for preparation of an alkali metal salt of nitrilotriacetic acid, said method comprising adding a mineral acid-stabilized mixture of formaldehyde and hydrogen cyanide to aqueous alkali metal hydroxide and subsequently reacting the resultant reaction mass; said method being conducted in the absence of added ammonia.

---

This invention relates to a process for the production of alkali metal salts of nitrilotriacetic acid. In a specific embodiment this invention is directed to a one-step process for the manufacture of trisodium nitrilotriacetate.

It is known that nitrilotriacetic acid, and alkali metal salts thereof, can be prepared from ammonia. In U.S. 2,855,428, Oct. 7, 1958, a process for the preparation of nitrilotriacetonitrile (which comprises reacting formaldehyde, hydrogen cyanide and ammonia in the presence of water and a small quantity of sulfuric acid) is described. The nitrilotriacetonitrile can be transformed into nitrilotriacetic acid (by hydrolysis in the presence of acid) or to the trisodium salt of the acid (by hydrolysis in the presence of sodium hydroxide). This process has many disadvantages. For example, it entails at least two steps for the preparation of an alkali metal salt of nitrilotriacetic acid. A chief disadvantage is the inability to obtain a high yield of the aforementioned nitrile product and an inability to added a substantially stoichiometric quantity of ammonia to the reaction medium without an attendant untoward increment in pH and a deleterious darkening of the reaction mixture by one or more extraneous side reactions.

An alkaline route to trisodium nitrilotriacetate is described in British Patent 976,319. The process of this British patent comprises the direct production of the trisodium salt from ammonia, hydrogen cyanide, formaldehyde and sodium hydroxide.

The process provided by the instant invention is also a simple one-step process for the manufacture of an alkali metal salt of nitrilotriacetic acid. It differs from the process of the British patent in that ammonia is not used as a starting material. Consequently, the present invention resides largely in the discovery that ammonia is not a necessary starting material for the preparation of a salt of nitrilotriacetic acid. Surprisingly, yields of an alkali metal salt of nitrilotriacetic acid which are comparable to the yields afforded by the process of the British patent are afforded by the process of this invention.

An object of this invention is to provide a one-step process for the preparation of an alkali metal salt of nitrilotriacetic acid. A further object is to provide an alkaline route to a salt of nitrilotriacetic acid which does not employ ammonia as a starting material. Additional objects will be apparent from the following detailed description and appended claims.

The objects of this invention are satisfied by providing a process for the preparation of a trialkali-metal salt of nitrilotriacetic acid, said process comprising reacting hydrogen cyanide, formaldehyde and an alkali metal hydroxide in the absence of added ammonia. A preferred embodiment of this invention is a process for the preparation of trisodium nitrilotriacetate, said process comprising reacting hydrogen cyanide, formaldehyde and sodium hydroxide in the absence of added ammonia.

As stated above, the process of this invention comprises reacting formaldehyde and hydrogen cyanide with an alkali metal hydroxide.

Formaldehyde from any source can be employed in the process of this invention. The commercial solutions containing 37 and 50 percent by weight formaldehyde are conveniently employed. Solutions of this type, having up to about 50 percent by weight formaldehyde, are conveniently prepared by depolymerizing paraformaldehyde in any known manner. Thus, for example, the depolymerization can be carried out by treating paraformaldehyde powder with water containing a catalytic quantity of a mineral acid such as sulfuric acid and then heating.

The alkali metal hydroxide employed in the process of the instant invention has a profound effect on the nature of the product obtained. For example, if sodium hydroxide is employed the product is a sodium salt of nitrilotriacetic acid. In other words, the cation within the alkali metal hydroxide is the cation within the nitrilotriacetic acid salt produced by this process. Preferably, the alkali metal hydroxide is selected from the class consisting of potassium hydroxide and sodium hydroxide. Sodium hydroxide is highly preferred.

The process of this invention is carried out by contacting the reactants under reaction conditions. Although it is not necessary to the success of the process, the reaction of this invention is usually carried out in the presence of a reaction solvent. The presence of the solvent facilitates the contacting of the reactants as well as their addition to the reaction zone and also provides for better control of the reaction. A highly preferred reaction medium is water. In other words, it is highly desirable that the process of this invention be carried out in an aqueous system. Pure water need not be employed. For example, co-solvents can be added thereto. Preferred co-solvents are lower alkanols, that is, monohydric alcohols which are free of carbon-to-carbon unsaturation and which contain from 1 to about 4 carbon atoms. Examples of lower alkanols are methanol, ethanol, isopropanol, n-butanols such as tert-butyl alcohol. Of the lower alkanols, methanol and ethanol are preferred and methanol highly preferred. Other co-solvents which can be employed include the alkoxy alkanols such as 2-ethoxyethanol and n-butyl Carbitol.

Solvent quantities of water are usually employed in this process. In other words, a weight of water which is about equal to the weight of the alkali metal hydroxide up to about ten times or more the weight of alkali metal hydroxide is used. There is no critical upper limitation on the amount of water employed. However, it is desirable that the amount of water be regulated so that reaction vessels of convenient size can be used and the product can be readily separated from the reaction mixture. When a co-solvent is admixed with the water it is usually preferred that from about $\frac{1}{10}$ to $\frac{9}{10}$ of the weight of water above described be replaced with one or more co-solvents. However, smaller or larger amounts of co-solvents can be employed if desired. It should be understood that in some instances, particularly at the higher concentrations of organic co-solvents, that the nitriloacetic acid salt product may precipitate during the course of the reaction as the concentration of the product in the solvent mixture exceeds the solubility limit of the salt. Preferably, the co-solvent mixture is a homogeneous liquid. However, homogeneity is not critical.

The process of this invention can be carried out in the absence of added water. In other words, the process can be carried out in the presence of an essentially non-reactive organic reaction medium. However, water is preferred to organic solvents because it is less expensive than most organic reaction media.

For economic considerations, it is usually desirable that the amount of hydrogen cyanide employed be substantially stoichiometric with the amount of formaldehyde. In other words, it is desired that nearly 3 moles of hydrogen cyanide be used for each 3-mole portion of formaldehyde to be reacted. Greater or lesser amounts of formaldehyde and hydrogen cyanide can be employed, but it is preferred that the amount be within the 10 percent lesser to 10 percent greater than the stoichiometric quantity, i.e., a substantially stoichiometric amount.

For each 3 moles of hydrogen cyanide reacted in this process, 3 moles of alkali metal hydroxide metal are reacted. Although the process can be carried out using this ratio of reactants it is not necessary to do so. Usually, better results are obtained if an excess of sodium hydroxide is present in the reaction mixture. Usually a slight excess, say up to 5 to 10 weight percent, is used.

The reaction temperature is not critical and temperatures within the range of from 30 to about 100° C. usually suffice. Good results are obtained if at the start of the reaction a temperature within the range of from about 30 to 60° C. is employed and this is increased during the course of the reaction to from about 80 to 100° C. near the end of the reaction period. The temperature increase can be affected by constantly increasing the temperature during the reaction (or during the period of addition of one reactant to another) or by a step-wise increase in temperature.

The reaction pressure is not critical and a convenient pressure can be employed. Usually atmospheric pressure is used. However, superatmospheric pressures can be employed if it is desired to keep a low boiling reaction medium in the liquid state when the reaction temperature employed is above the normal boiling point of the reaction medium. Thus, pressures within the range of from one to about 10 atmospheres can be used. Similarly, subatmospheric pressures can be employed, if desired. In some instances the use of subatmospheric pressures (say 15 to 50 and preferably about 30 mm. of Hg) toward the end of the reaction gives enhanced results. Pressures lower than atmosphere facilitate the removal of ammonia.

The time of the reaction is not a truly independent variable but is dependent, at least to some extent, on the other reaction conditions employed. For example, in many instances higher temperatures afford shorter reaction times. Furthermore, in many instances the reaction time can be decreased by agitating the reaction mixture, e.g., by stirring or rocking. In general, reaction times within the order of about 15 minutes to 14 hours are sufficient.

The nitrilotriacetate product can be isolated in any convenient manner. For example, the liquid reaction mixture can be evaporated until the product separates by precipitation. Furthermore, large quantities of a solvent in which the desired salt product is insoluble can be added to the reaction mixture to precipitate the product from solution.

The following examples serve to illustrate the process of this invention but do not limit it. All parts are by weight unless otherwise indicated. The first example illustrates the type of result obtained when the process of British Patent 976,319 is employed. That example is included herein for comparison purposes to point out that comparable yields of product are afforded by the process of the instant invention although the ammonia employed as a starting material in the process of the British patent is not used in the instant process.

EXAMPLE I

A reaction vessel equipped with stirring means, reflux condensing means, temperature indicating means and liquid addition means was charged with 286.5 parts of 50 percent sodium hydroxide solution, 271 parts of water and 57.8 parts of 29 percent ammonium hydroxide. The mixture of reactants was cooled to −5° C. Thereafter, while stirring, a mixture of 87.1 parts of 96 percent hydrogen cyanide and 238.3 parts of 30 percent formaldehyde aqueous solution diluted to 244 parts (by volume) and stabilized with 1.5 parts of sulfuric acid was added dropwise to the reaction vessel at a rate of about 1.12 parts (by volume) per minute over a 214 minute period. During this time the reaction temperature was allowed to rise from −5° C. to 96° C. at a uniform rate.

After all the hydrogen cyanide mixture was added to the reaction vessel the resultant contents were boiled for about 15 minutes. Any excess cyanide and ammonia present were removed by the addition of 23.5 parts of 36.1 percent formaldehyde solution. After the addition of this material the resultant reaction mixture was heated for a 45-minute period at near 100° C. The mixture was then cooled to 60° C. and then 0.8 part (by volume) of 31 percent hydrogen peroxide was added to the resultant mixture. After 15 minutes an additional 0.85 part (by volume) of 31 percent hydrogen peroxide was added. Thereafter, 0.4 part of activated charcoal was added. The resultant reaction mixture was then heated at 60° C. for 30 minutes, then cooled to room temperature and the charcoal then removed by filtration.

Titration of a sample of the reaction mass with ferric chloride indicates that trisodium nitrilotriacetic acid was produced in 80 percent yield.

The reaction mixture (minus the sample used for titration) was evaporated until a solid mass was produced. To this was added 450 parts by weight of methanol and the mixture heated for one hour at reflux. The solid portion was removed from the liquid by filtration, washed with additional methanol and air dried. The sodium salt of nitrilotriacetic acid, 225 parts, was obtained.

EXAMPLE II

A reaction vessel similar to that employed in Example I was charged with 286.5 parts of 50 percent sodium hydroxide solution and 271 parts of water. In a separate reaction flask was added 234 parts of 36.1 percent Formalin solution, 1.5 parts of concentrated sulfuric acid and 83 parts of hydrogen cyanide. This solution, 325 parts by volume, was transferred to the liquid addition means attached to the reaction vessel. Thereafter the solution was added to the reaction vessel in the following manner.

| Time (minutes) | Temperature | HCN—CH$_2$O solution added (parts by volume) |
| --- | --- | --- |
| 0 | 28 | |
| 12 | 35 | 30 |
| 17 | 37 | 45 |
| 27 | 38 | 108 |
| 87 | 31 | |
| 101 | 33 | 122 |
| 111 | 40 | 125 |
| 121 | 49 | 152 |
| 131 | 51 | 170 |
| 141 | 56 | 191 |
| 151 | 58 | 202 |
| 161 | 63 | 214 |
| 171 | 70 | 236 |
| 181 | 75 | 245 |
| 191 | 76 | 255 |
| 201 | 81 | 283 |
| 211 | 85 | 305 |
| 221 | 90 | 325 |

After the addition of the hydrogen cyanide-formaldehyde solution was complete, the resultant reaction mixture was boiled for 15 minutes. Thereafter, 23.5 parts of 36.1 percent Formalin solution was added to remove any excess ammonia and hydrogen cyanide. Then the mixture was cooled to 60° C. and 0.8 part by volume of hydrogen peroxide was added. After boiling for 15 additional minutes, an additional 0.8 part of 31 percent hydrogen peroxide solution was added.

After an additional 15-minute boiling period, 0.4 gram of activated charcoal was added to the reaction mixture.

The solution was then maintained at 60° C. for 30 minutes and then filtered to remove the activated charcoal.

A sample of the reaction mass was titrated for ferric chloride. Titration indicated that a 78.6 percent yield of trisodium nitrilotriacetate was produced.

The reaction mixture minus the sample used for titration is evaporated until the nitrilotriacetate salt precipitates. The salt is then added to twice its weight of methanol and heated for one hour at reflux. The solid is removed by filtration, washed with additional methanol and dried. Trisodium nitrilotriacetate is obtained.

EXAMPLE III

A 211 part portion of a Formalin solution, 37.3 percent formaldehyde, containing 12 percent methanol and 1.4 parts of concentrated sulfuric acid, is admixed with a 77.7 part portion of 96 percent hydrogen cyanide. This mixture was added slowly over a three-hour period to a mixture of 265.8 parts of 50.3 percent sodium hydroxide and 251 parts of water. The first one-third of the hydrogen cyanide-formaldehyde mixture was added while maintaining the temperature in the reaction vessel at 30° C. The remainder of the hydrogen cyanide-formaldehyde solution was added while continuously increasing the temperature from 30 to 91° C.

After completion of the addition of the hydrogen cyanide-formaldehyde mixture, the resultant reaction mass was heated at 90° C. for an additional ten minutes. Following this, 21.1 parts of Formalin solution was added and the mixture then heated for 25 minutes while constantly increasing the reaction temperature to 96° C. Titration with ferric chloride indicated that trisodium nitrilotriacetate was produced in 75.5 percent yield.

EXAMPLE IV

A process of Example III was essentially repeated except that the Formalin solution contained 1.5 percent methanol instead of 12 percent methanol. Trisodium nitrilotriacetate was produced in 75.2 percent yield.

The quantity of reagents used was 230 parts of 37.5 percent Formalin (1.5 percent methanol), 1.5 parts of concentrated sulfuric acid, 85.1 parts of 96 percent hydrogen cyanide, 291 parts of 50.3 percent sodium hydroxide and 276 parts of water.

EXAMPLE V

The process of Example III was essentially repeated except that the first one-third of the hydrogen cyanide-formaldehyde mixture was added to the sodium hydroxide over a 30 minute period at 30° C. and the resultant mixture then held at 30° C. for one hour. The remainder of the hydrogen cyanide-formaldehyde mixture was added over a two-hour period followed by a 2.25 hour reflux period. Trisodium nitrilotriacetate was produced in 79.1 percent yield.

The quantity of reagents used was 238 parts of 37.3 percent Formalin, 1.5 parts of concentrated sulfuric acid, 87.8 parts of 96 percent hydrogen cyanide, 300.5 parts of 50.3 percent sodium hydroxide and 284 parts of water. A second addition of 23.8 parts of 37.3 percent aqueous formaldehyde solution was added at the end of the reaction.

Similarly, the preparation of trilithium nitrilotriacetate and tripotassium nitrilotriacetate are prepared by substitution of lithium hydroxide and potassium hydroxide, respectively, for the sodium hydroxide employed in the above process.

EXAMPLE VI

In this reaction an equivalent amount of glycine was substituted for one-third of the hydrogen cyanide-formaldehyde mixture employed in the process of Example III. The remainder of reaction was carried out in a manner similar to that employed in Example III (from the point of the addition of the latter two-thirds of the hydrogen cyanide-formaldehyde solution) as detailed below.

Hydrogen cyanide-formaldehyde solution was prepared by adding 83.9 parts of 96 percent hydrogen cyanide to a mixture of 225 parts of formaldehyde and 1.5 parts of concentrated sulfuric acid. The resultant solution was added over a two-hour period to a mixture of 425 parts of 50.3 percent sodium hydroxide, 112.4 parts of glycine and 403 parts of water. During the course of addition, the reaction temperature was increased from 27° to 84° C. During an additional one-hour refluxing period the temperature rose to 98° C. Titration with ferric chloride indicated that trisodium nitrilotriacetate had been produced in 75.4 percent yield.

Alkali metal salts of nitrilotriacetic acid such as trisodium nitrilotriacetate are well known sequestering or chelating agents and in many respects are considered equivalent to the widely used compound ethylene diamine tetraacetic acid and its alkali metal salts. Furthermore, alkali metal nitrilotriacetates are excellent builders in detergent formulations. When employed in this manner the detergent may be selected from an anionic synthetic soapless detergent, a non-ionic detergent, an amphoteric electrolyte detergent, zwitter-ionic detergent or mixture thereof. In addition to the nitrilotriacetic acid builders such as water-soluble inorganic polyphosphates or ethane-1-hydroxyl-1,1-diphosphonic acid can be employed.

Having fully described the novel process of this invention, the advantages thereof, the products produced thereby and their utilities, it is desired that this invention be limited only within the lawful scope of the appended claims.

I claim:

1. A process for preparing an alkali metal salt of nitrilotriacetic acid, said process comprising adding a mineral acid-stabilized mixture of substantially stoichiometric quantities of formaldehyde and hydrogen cyanide to an aqueous alkali metal hydroxide solution, wherein the amount of said metal hydroxide is from substantially three moles of hydroxide per each three moles of hydrogen cyanide to about a 10 weight percent excess, and subsequently reacting the resultant reaction mass at a temperature of from about 30° to about 100° C.; said process being conducted in the absence of added ammonia.

2. The process of claim 1 wherein said mixture of hydrogen cyanide and formaldehyde also contains water.

3. The process of claim 2 wherein said mixture is stabilized with sulfuric acid.

4. The process of claim 3 wherein the amount of sulfuric acid is from about 1.7 to about 1.8 parts per each 100 parts by weight of formaldehyde.

5. The process of claim 4 wherein the alkali metal hydroxide is sodium hydroxide.

6. The process of claim 5 being further characterized by separating trisodium nitrilotriacetate from the reaction mixture.

7. The process of claim 1 wherein said alkali-metal hydroxide is sodium hydroxide.

References Cited

FOREIGN PATENTS 976,319  11/1964  Great Britain.

OTHER REFERENCES

A. E. Martell et al.: J. Org. Chem., vol. 15, pp. 46–50 (1950).

Polstroff et al.: Ber. deut. Chem., vol. 45, pp. 1905–1912 (1912).

JAMES A. PATTEN, Primary Examiner.

A. P. HALLUIN, Assistant Examiner.